(12) United States Patent
Robinson et al.

(10) Patent No.: US 11,765,506 B2
(45) Date of Patent: Sep. 19, 2023

(54) AUTOMOBILE AUDIO SYSTEM

(71) Applicant: Tymphany Worldwide Enterprises Limited, Grand Cayman (KY)

(72) Inventors: Matthew Robinson, Grand Cayman (KY); Thomas Pieter J. Peeters, Grand Cayman (KY); Wade Forrest Conklin, Grand Cayman (KY); Rowan Dylan Gower Williams, Grand Cayman (KY)

(73) Assignee: TYMPHANY WORLDWIDE ENTERPRISES LIMITED, Grand Cayman (KY)

( * ) Notice: Subject to any disclaimer, the term of this patent is extended or adjusted under 35 U.S.C. 154(b) by 0 days.

(21) Appl. No.: 17/684,044

(22) Filed: Mar. 1, 2022

(65) Prior Publication Data

US 2022/0279275 A1 Sep. 1, 2022

Related U.S. Application Data

(60) Provisional application No. 63/154,989, filed on Mar. 1, 2021.

(51) Int. Cl.
*H04R 3/12* (2006.01)
*G06F 3/16* (2006.01)
(Continued)

(52) U.S. Cl.
CPC ............... *H04R 3/12* (2013.01); *B60K 35/00* (2013.01); *G06F 3/165* (2013.01); *G06V 40/10* (2022.01); *H04R 1/025* (2013.01); *H04R 1/403* (2013.01); *H04R 1/406* (2013.01); *H04R 3/005* (2013.01); *H04R 3/04* (2013.01); *H04S 7/30* (2013.01); *B60K 2370/12* (2019.05); *B60K 2370/152* (2019.05); *B60K 2370/157* (2019.05); *B60K 2370/193* (2019.05); *H04R 2201/401* (2013.01); *H04R 2410/07* (2013.01); *H04R 2430/01* (2013.01); *H04R 2499/13* (2013.01); *H04S 2420/01* (2013.01)

(58) Field of Classification Search
None
See application file for complete search history.

(56) References Cited

U.S. PATENT DOCUMENTS

9,763,003 B2 * 9/2017 Usher .................... H04R 3/005
10,214,145 B2 * 2/2019 Jaegal ....................... B60R 1/00
(Continued)

*Primary Examiner* — Paul W Huber
(74) *Attorney, Agent, or Firm* — Muncy, Geissler, Olds & Lowe, P.C.

(57) ABSTRACT

An automobile audio system for an automobile includes an audio processing unit, a set of external microphones to record external sound and a set of internal loudspeakers to internally reproduce audio. Furthermore, the automobile audio system includes a transmission switching mechanism. The transmission switching mechanism is manually configurable between at least two manual transmission configurations including a manually activated configuration wherein the set of external microphones is communicatively coupled to the set of internal loudspeakers such that the external sound is reproducible by at least a subset of the set of internal loudspeakers and a manually deactivated configuration wherein the set of external microphones is communicatively decoupled to the set of internal loudspeakers.

19 Claims, 5 Drawing Sheets

(51) Int. Cl.

| | |
|---|---|
| *H04R 1/40* | (2006.01) |
| *H04R 3/00* | (2006.01) |
| *H04R 1/02* | (2006.01) |
| *B60K 35/00* | (2006.01) |
| *G06V 40/10* | (2022.01) |
| *H04R 3/04* | (2006.01) |
| *H04S 7/00* | (2006.01) |

(56) References Cited

U.S. PATENT DOCUMENTS

| | | | |
|---|---|---|---|
| 10,536,791 B2 | 1/2020 | Wacquant et al. | |
| 10,643,598 B2* | 5/2020 | Hoggarth | G06V 20/56 |
| 10,747,231 B2* | 8/2020 | Akotkar | G10L 25/30 |
| 10,755,691 B1* | 8/2020 | Herman | G10K 11/17853 |
| 2012/0121113 A1* | 5/2012 | Li | H04R 1/403 |
| | | | 381/86 |
| 2013/0188794 A1* | 7/2013 | Kawamata | H04R 29/00 |
| | | | 381/56 |
| 2013/0223643 A1* | 8/2013 | Sato | G08G 1/166 |
| | | | 381/86 |
| 2015/0137998 A1* | 5/2015 | Marti | G10K 15/02 |
| | | | 340/901 |
| 2017/0127165 A1* | 5/2017 | Kanagaraj | H04R 1/025 |
| 2020/0396553 A1* | 12/2020 | Van Wiemeersch | G06V 40/12 |
| 2022/0030368 A1* | 1/2022 | Young | B60R 11/0217 |

\* cited by examiner

| 6 | Audio Processing Unit |
| 23 | Wind Noise Analysis Block |
| 24 | Microphone Selection Block |
| 25 | Wind Noise Filter |

AUTOMOBILE AUDIO SYSTEM

CROSS REFERENCE TO RELATED APPLICATIONS

The present application claims priority to U.S. Provisional Application Ser. No. 63/154,989, which was filed on Mar. 1, 2021, the entire contents of which are hereby incorporated by reference.

FIELD OF THE INVENTION

The present invention relates to an automobile audio system. The invention further relates to an automobile and a method for reproducing sound in an automobile.

BACKGROUND OF THE INVENTION

The exterior chassis of automobiles shields the occupants of the automobile from outside weather, noise, drafts, bugs, filth, pollution, animals, and undesired intruders. Even through a physical barrier such as the exterior chassis is useful for many purposes, it also hinders listening to an external environment and reduces the capability of communication between people outside the automobile and occupants inside the automobile. Typically, listening to and communicating with external sources is permitted by establishing a physical opening in the exterior chassis of the automobile, e.g., by opening windows. However, such an opening may expose occupants of the automobile to weather and external dangers.

U.S. Pat. No. 10,536,791 B2 discloses a vehicular sound processing system including a plurality of interior microphones that detect interior sound emanating from within the interior cabin of the vehicle, and a plurality of exterior microphones that detect exterior sound emanating from exterior the vehicle. The interior microphones also detect exterior sound. A sound processor processes exterior microphone signals to determine exterior sound detected by the exterior microphones. The sound processor processes interior microphone signals to distinguish voices of occupants present within the interior cabin from non-vocal sound emanating from within the interior cabin and from exterior sound emanating from exterior the vehicle. The sound processor processes the exterior microphone signals to determine a sound of interest emanating from exterior of the vehicle. Responsive to determination of the sound of interest, the sound of interest is played by loudspeakers so that a driver of the vehicle can hear the sound of interest.

SUMMARY OF THE INVENTION

The inventors have identified the above-mentioned problems and challenges related to automobiles, and subsequently made the below-described invention which may provide advantageous automobile audio systems.

The invention relates to an automobile audio system, an automobile, and a method for reproducing external sound in an automobile as presented by the claims.

By having a manually configurable transmission switching mechanism, the invention permits occupants to listen to external sound on demand, which is advantageous. Thus, occupants may manually activate listening to, for example, the weather, a city environment, a nature environment, and external people such as pedestrians, cyclists, drivers, occupants of other vehicles, moped riders, and even horseback riders. Meanwhile, the occupants of the vehicle may have minimal exposure to weather, drafts, bugs, filth, animals, pollution, and criminals such as robbers and thieves, in contrast to the situation of listening to external sound by establishing a physical opening in the exterior chassis of the automobile, e.g., by opening windows.

From a starting point of typical traffic conditions, manually activating a coupling between external microphones and internal loudspeakers is counterintuitive due to the noisy environment provided by combustion engines. However, on a national and global level, the percentage of electrical cars may increase dramatically in the future. The replacement of combustion engines with electrical engines, will generally reduce traffic noise and may thus reduce the need to block outside noise from reaching occupants of an automobile. In this future perspective, having a manual activation of the coupling between external microphones and internal loudspeakers may be far more relevant and advantageous. The invention is not restricted to electrical cars but may be utilized in any type of automobile.

By having a manually configurable transmission switching mechanism, occupants may not have to rely solely on automatic activation of a coupling between external microphones and internal loudspeakers, which is advantageous. Particularly, the conditions for automatic activation may be unclear, unreliable, or undesirable, and manual activation may thus provide and advantageous alternative.

Further, manually switching a transmission switching mechanism to communicatively couple external microphones to internal loudspeakers permits a greater utilization of auditory perception when navigating in traffic, which is advantageous. Thus, as a supplement to vision, hearing may be used for navigation in traffic.

BRIEF DESCRIPTION OF THE DRAWINGS

Various embodiments of the invention will in the following be described with reference to the drawings where.

DETAILED DESCRIPTION

In the following, various concepts of the invention are presented without reference to particular embodiments.

An automobile audio system may be understood as an audio system integrated in an automobile, or an audio system intended to be integrated in an automobile. When integrated, an automobile audio system according to embodiments of the invention has a set of loudspeakers integrated/located within the interior of the automobile, i.e., internal loudspeakers. These loudspeakers may be used to reproduce any type of audio as known from conventional automobile audio systems, e.g., radio audio, telecommunication audio, media audio such as music, etc.

Further, when integrated, an automobile audio system according to embodiments of the invention has a set of microphones located on the exterior of the automobile, i.e., external microphones. These microphones are not limited to any particular type of microphone but may for example be based on microelectromechanical system (MEMS) technology. Microphones may for example be integrated in suitable cavities of the exterior chassis of the automobile. At least some of the microphones are typically in air communication with the environment outside of the vehicle such that sound does not have to be transmitted through a dampening surface, e.g., a part of the exterior chassis, to be picked up by microphones. However, microphones are not restricted to a particular arrangement and may also be associated with sound dampening means, e.g., windscreens or windshields for microphones.

An automobile audio system according to embodiments of the invention comprises an audio processing unit. Such a unit may for example be implemented as a digital signal processor, an analog signal processor, or any other system of digital and/or analog electronics configured to facilitate control of communicative coupling between microphones and loudspeakers. Thus, an automobile audio system is not restricted to a single central unit, as long as it can facilitate communicative coupling and decoupling.

Communicative connections between loudspeakers, microphones, and the audio processing unit may typically be implemented through wired connections, but may in principle also be wireless, e.g., Bluetooth or even Wi-Fi or radio communication. A purpose of the connections between elements of the invention is that audio recorded by a microphone can be transmitted to a loudspeaker for reproduction of the recorded audio signal. Such reproduction may typically be real-time production but may in principle also be delayed slightly by processing or recorded to be reproduced later.

A feature of the automobile audio system is that the set of external microphones can either be, at least partly, communicatively coupled to the set of internal loudspeakers, or be communicatively decoupled to the set of internal loudspeakers. A communicative decoupling may in practice also be a substantial lowering of the reproduction volume of the sound, i.e., a reduction of the sound pressure level of the reproduced audio relative to a communicative coupling, e.g., a reduction of sound pressure level of at least 50%, such as at least 70%, such as at least 90%.

The coupling and decoupling are at least partly facilitated by the audio processing unit. The audio processing unit may for example be a digital signal processor programmed to either transmit audio signals from the microphones to the loudspeakers or not, for example depending on other input, such as input from a transmission switching mechanism or audio analysis in the audio processing unit itself. However, not that the coupling and decoupling is not limit to a particular implementation. It may also be implemented as several digital signal processors, or a central processing unit controlling various switches.

A transmission switching mechanism is a type of manually configurable switch, which controls coupling between loudspeakers and microphones. It is manually configurable from the automobile interior by at least one occupant of the automobile, e.g., a driver or a passenger of the automobile. The transmission switching mechanism may for example be implemented as a physically movable switch, lever, or button. It may also be implemented as a touch switch, or through a touch-sensitive display such as a smartphone display, or a touch-sensitive display built into the automobile. It may also be implemented through non-touch mechanisms such as voice control, a proximity sensor, or wireless communication with the automobile audio system, e.g., through Bluetooth, Wi-Fi, radiocommunication, or RFID, e.g., with the automobile key. Alternatively, it may be linked with other manually controllable features of the automobile or the automobile audio system, for example window opening mechanisms (e.g., microphones and loudspeakers are coupled when windows are closed), starting of the automobile, speed of the automobile, gearbox (e.g., microphones and loudspeakers are coupled when automobile is in reverse), etc.

The transmission switching mechanism has at least two manual transmission configurations, but may also have more than two, such as three, four, five, or more than five manual transmission configurations.

One manual transmission configuration is a manually activated configuration. Here, the set of external microphones is communicatively coupled to the set of internal loudspeakers. In other words, external sound recorded by the set of external microphones is reproduced by the set of internal loudspeakers.

Another manual transmission configuration is a manually deactivated configuration. Here, the set of external microphones is communicatively decoupled to the set of internal loudspeakers. In other words, external sound is limited from being fully reproduced by the loudspeakers.

Upon coupling, the individual communicative couplings may be distributed between individual microphones and individual loudspeakers in any manner. For example, an audio signal recorded by one microphone may be passed on to one loudspeaker, more than one loudspeaker, or all loudspeakers. Similarly, an audio signal reproduced by a loudspeaker may stem from one microphone, more than one microphone, or all microphones. The communicative couplings may be hardwired, e.g., a certain loudspeaker is connected to a certain subset of the loudspeakers, or the communicative coupling may be controlled dynamically, e.g., the audio processing unit dynamically controls how individual loudspeakers are connected to individual loudspeakers. Such dynamic control may for example be used to provide personalized audio to individual occupants.

An additional optional manual transmission configuration is an automatic transmission configuration. This configuration has two sub-configuration; an automatically activated configuration and an automatically deactivated configuration. These two configurations may for example be seen as automatic counterparts to the manually activated configuration and the manually deactivated configuration, but which are controlled automatically, for example based upon analysis of the content of the external sound recorded by the set of microphones. For example, the automatic transmission configuration is as in the automatically deactivated configuration as a starting point, and upon recognition of sound from a siren in the content of the external sound, the automatically activated configuration is automatically switched to the automatically activated configuration, which may alert occupants in the vehicle. A siren may for example be from an ambulance, a police vehicle, a fire vehicle, or even a civil defense siren.

Optionally, embodiments of the invention may also comprise a set of internal microphones, a set of external loudspeakers, and a communication switching mechanism controlling coupling and decoupling between the internal microphones and the external loudspeakers. These optional features may be seen as a mirrored or reversed counterpart to the external microphones, internal loudspeakers, and transmission switching mechanism. That is, the communication switching mechanism is manually configurable between a manually activated communication configuration, and a manually deactivated communication configuration, in which the internal microphones and the external loudspeakers are communicatively coupled or decoupled, respectively.

According to embodiments of the invention, any implementation of the external microphones, internal loudspeakers, and the transmission switching mechanism, can also be used in implementation of the internal microphones, external loudspeakers, and the communication switching mechanism.

The communication switching mechanism and the transmission switching mechanism may be implemented as a combined switching mechanism, controlling the coupling between internal microphones and external loudspeakers simultaneously to controlling the coupling between external microphones and internal loudspeakers. Or the communication switching mechanism and the transmission switching mechanism may be implemented as separately controllable switching mechanisms.

In the following, various embodiments of the invention are described with reference to the figures.

Figure 1:
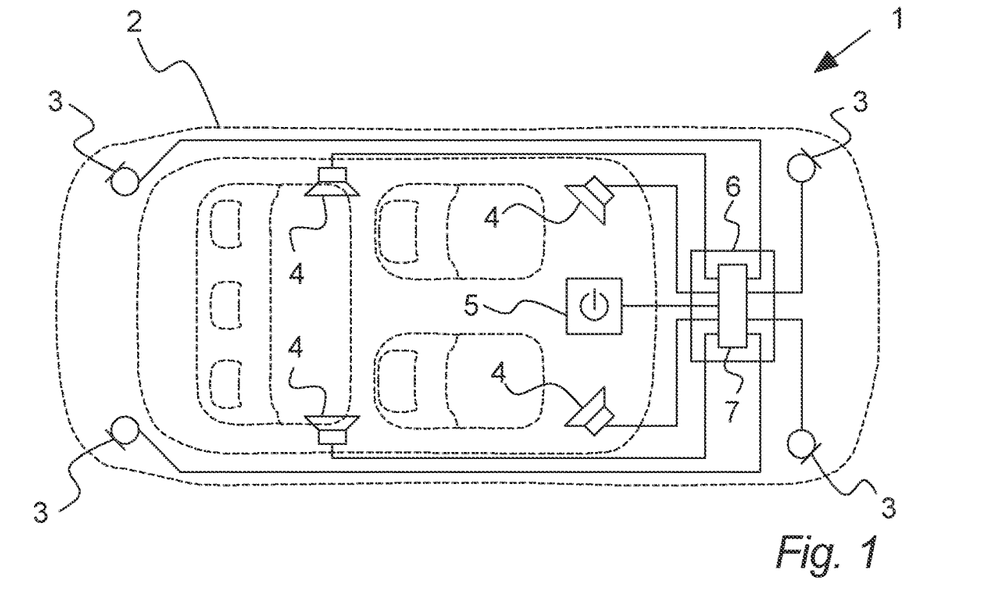
FIG. 1 illustrates an automobile audio system according to an embodiment of the invention.

FIG. 1 illustrates an automobile audio system 1 according to an embodiment of the invention. The arrangement of the audio system 1 relative to an automobile 2 illustrated with dashed lines indicate a possible integration of the automobile audio system 1 in an automobile 2.

The outer circumference and the size of the cabin of the automobile 2 is indicated in the illustration, as well as seating within the cabin. The cabin may also be understood as the automobile interior.

The automobile audio system 1 comprises an audio processing unit 6 implemented using a digital signal processor. The audio processing unit 6 is communicatively connected through wired connections to a set of external microphones 3. Further, the audio processing unit 6 is communicatively connected through wired connections to a set of internal loudspeakers 4.

The automobile audio system 1 further comprises a transmission switching mechanism 5 connected to the audio processing unit 6 such that the transmission switching mechanism 5 can be used to manually configure the coupling and decoupling between microphones 3 and loudspeakers 4 via a switching block 7 of the audio processing unit 6. In this embodiment, the switching block 7 is digitally programmed onto the digital signal processor to control whether a signal recorded by the microphones 3 is forwarded to the loudspeakers 4 or not.

The transmission switching mechanism 5 has two configurations: a manually activated configuration and a manually deactivated configuration.

In the manually activated configuration, the microphones 3 are coupled to the internal loudspeakers 4. An external sound recorded by one of the microphones 3 is transmitted as an audio signal into the audio processing unit 6, through the switching block 7 and through to the loudspeakers 4.

When the automobile audio system 1 is integrated in an automobile 2, the external sound can thus be reproduced internally such that occupants in the automobile 2 hear the external sound via the loudspeakers. In this embodiment, an external sound recorded by one or more microphones is forwarded to all of the loudspeakers through the switching block 7, such that the external sound is reproduced internally as a mono signal, in contrast to more complex reproduction types such as a stereo signal or surround sound.

In the manually deactivated configuration, the microphones 3 are decoupled from the internal loudspeakers 4. Thus, no audio signal based on external sound is transmitted to the internal loudspeaker 4. Even through the external microphones 3 may record an external sound, the resulting recorded sound signals are halted at the switching block 7.

The transmissions switching mechanism 5 is implemented as a physically movable button accessibly from the driver seat. Manually pressing the button switch the transmission switching mechanism between the two configurations.

Optionally, the automobile audio system 1 may further comprise a manually adjustable transmission volume mechanism which regulates the loudness of reproduction of the external sound. Such a transmission volume mechanism may for example be implemented as a knob, buttons, or on a touch sensitive display. In some embodiments, the transmission volume mechanism and the transmission switching mechanism are a single combined mechanism, e.g., a rotational knob which regulates the loudness of reproduction of external sound which further couples/decouples the microphones 3 and the loudspeakers 4 at a certain rotational angle of the knob.

In some embodiments of the invention, the transmission volume mechanism is independently controllable from music, radio, and telecommunication volume of the automobile audio system. In other embodiments, a single transmission volume mechanism simultaneously controls both the loudness of reproduction of the external sound, as well as loudness of other sound reproduced by the automobile audio system 1 using the loudspeakers 4, such as music, radio, and telecommunication.

Figure 2:
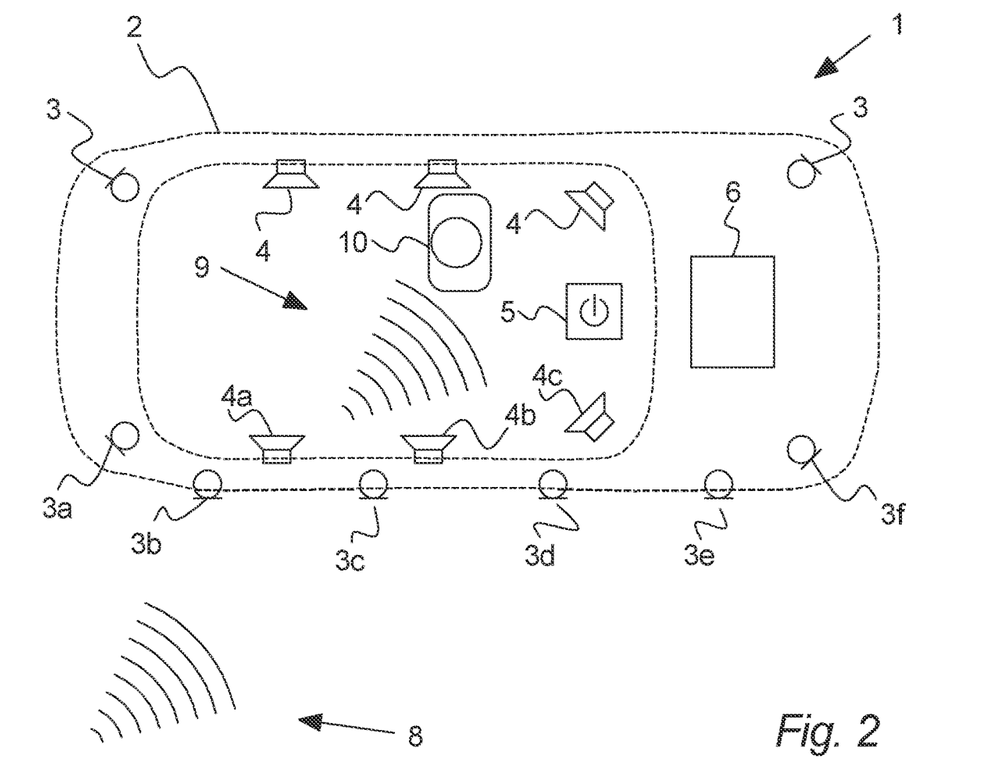
FIG. 2 illustrates recording external sound and reproducing sound directionality according to an embodiment of the invention.

FIG. 2 illustrates recording external sound 8 and reproducing sound directionality according to an embodiment of the invention.

As in FIG. 1, the arrangement of the audio system 1 relative to an automobile 2 illustrated with dashed lines indicate a possible integration of the automobile audio system 1 in an automobile 2.

For simplicity, communicative connections between the external microphones 3, the audio processing unit 6, and the internal loudspeakers 4 are not shown.

The embodiment illustrated in FIG. 2 has several elements in common with the embodiment illustrated in FIG. 1. In addition, the embodiment illustrated in FIG. 2 has additional external microphones 3, the microphones record external sound 8, and the loudspeakers 4 emit a reproduction of external sound 9 based on the external sound 8. Furthermore, the approximate sound directionality of the external sound is replicated by the reproduction of external sound 9.

In the schematic illustration, the external sound 8 is stems from a source in a lower left-hand side direction. Since the embodiment comprises an array of microphones 3a-3f, beamforming is utilized to obtain a sound directionality, relative to said automobile audio system 1 (or automobile 2, when the automobile audio system is integrated).

Beamforming is a signal processing technique, in which sensor arrays (e.g., microphones) can be utilized for directional signal reception. The relative phase and amplitude recorded by the individual microphones can be used to pinpoint a directionality. In simple terms, when the distance from each microphone and the sound source is different, the sound will arrive at different times to the different microphones. This time difference can be used to infer a direction, or even a position, of the source.

In the illustrated embodiment, the external sound arrives at microphone 3b first, then microphone 3a, then microphone 3c, then microphone 3d etc. The resulting audio signals from the individual microphones are processed in the audio processing unit 6, which analyze theses audio signals through a beamforming algorithm in which relative phases and amplitudes are compared while taking the microphone locations into account. Since the external sound arrives at microphone 3b, then microphone 3a, then microphone 3d, an approximate directionality can be estimated. By considering the exact timing between arrival of the external sound, the directionality can be estimated more precisely.

Generally, embodiments of the invention are not restricted to a particular type of beamforming analysis or algorithm, and any type may be utilized.

Based on the beamforming algorithm, a directionality of the external sound 8 is thus obtained. This directionality is replicated in the reproduction of the external sound 9 by the internal loudspeakers 4.

In this embodiment, the internal loudspeakers 4 utilize beamforming to replicate the directionality. Since some of the internal loudspeakers 4a-4c form an array, beamforming can be used for directional signal transmission. Many of the same principles as for directional signal reception apply, but the process is be reversed, e.g., a relative phase and amplitude has to be encoded onto the individual audio signals which are provided to the individual loudspeakers. Consequently, the emitted audio signals from the loudspeakers interfere, and as a result of this interference, the directionality of the reproduction of the external sound 9 replicates the directionality of the external sound 8.

Again, note that embodiments of the invention are not restricted to a particular type of beamforming analysis or algorithm.

In an alternative embodiment, the replication may for example be performed based on only reproducing the sound in a subset of the loudspeakers, e.g., loudspeaker 4a.

In another embodiment, the replication may be performed using directional reproduction of sound guided to one side of an occupant, e.g., using loudspeaker pairs as described in this disclosure.

In another alternative embodiments, the replication may for example be performed based on applying a frequency-dependent directionality filter to a recording of the external sound to establish a directionality-encoded audio signal. This signal can then be reproduced by at least a subset of the internal loudspeakers to replicate the sound directionality.

As sound arrives at an occupant, the size and shape of the head, ears, ear canal, density of the head, size and shape of nasal and oral cavities, etc., may transform the sound and affect how it is perceived, boosting some frequencies and attenuating others. The relation between an emitted and a perceived sound may be referred to as a head-related transfer function. By applying one or more frequency-dependent directionality filters, it is thus possible to encode a certain directionality into the signal. Accordingly, an occupant may perceive a certain directionality of the reproduction of the external sound 9.

In various embodiments, the one or more frequency dependent filters can either generate a mono or a stereo signal. These signals may be generated for occupants at an individual level (an individual mono or stereo signal for each occupant), or generated collectively for all occupants. The frequency dependent filters can for example depend on the directionality of the external sound 8 and, optionally, on biometrics of one or more occupants. For example, from a lookup table, or from measurements of occupants.

Replicating the sound directionality of the external sound 8 with the reproduction of external sound 9 may improve auditory perception when navigating in traffic and improve an occupants ability to locate a particular sound source, such as a siren, which is advantageous.

Figure 3A:
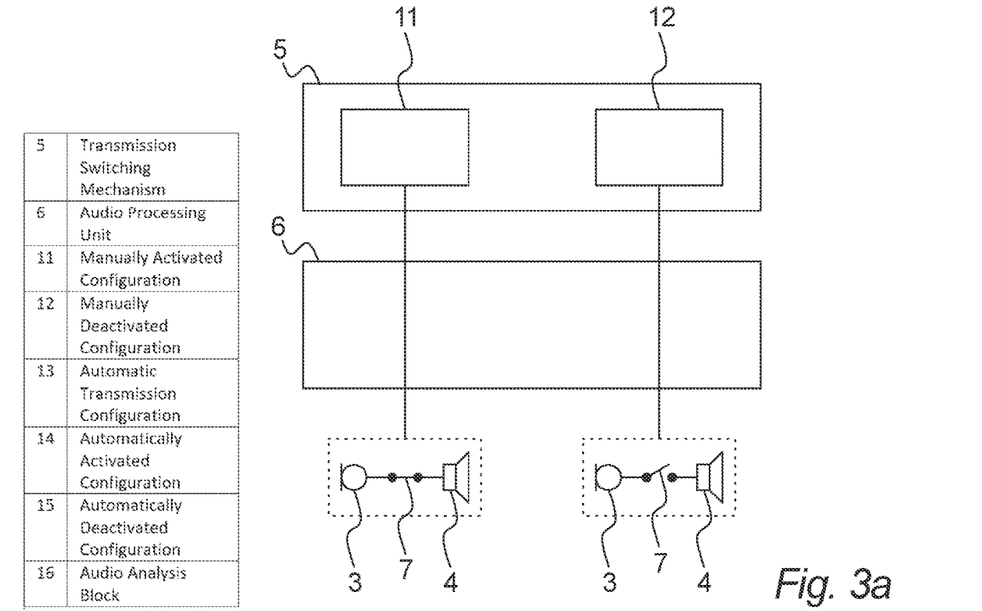
FIGS. 3a-b illustrate exemplary transmission switching mechanisms and manual transmission configurations schematically according to embodiments of the invention.
Figure 3B:
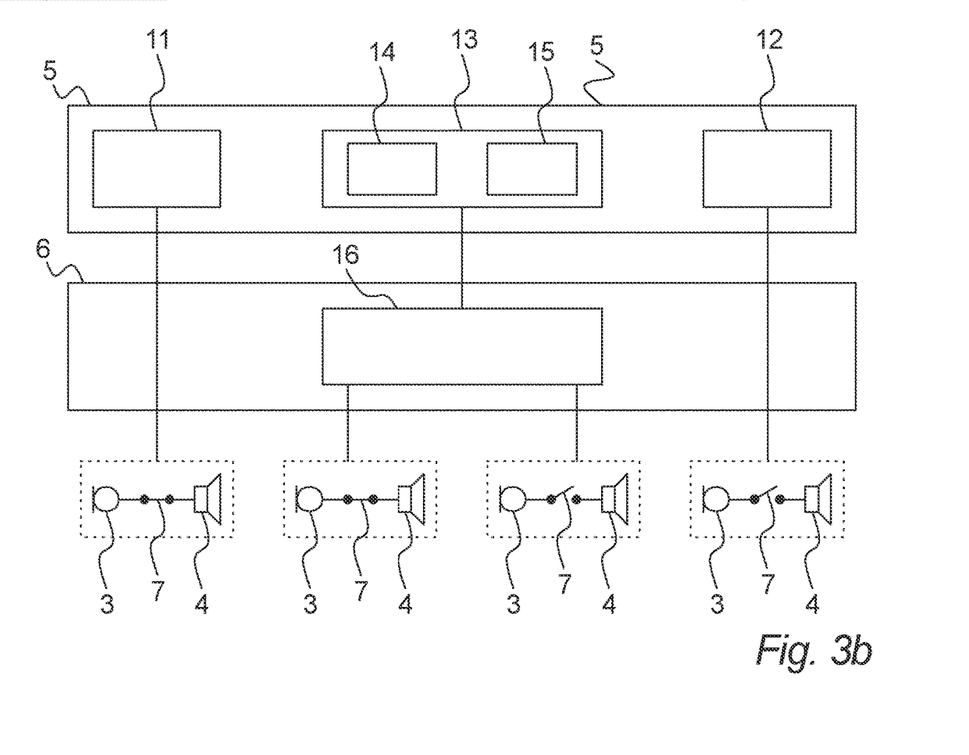

FIGS. 3a-b illustrate exemplary transmission switching mechanisms 5 and manual transmission configurations 11,12,13 schematically according to embodiments of the invention. Particularly, FIG. 3b illustrates a transmission switching mechanism 5 comprising an automatic transmission configuration 13.

The transmission switching mechanism 5 of FIG. 3a is a physical toggle which has two possible configurations: a manually activated configuration 11 and a manually deactivated configuration 12. The transmission switching mechanism is connected to the audio processing unit 6, which controls the coupling between external microphones 3 and internal loudspeakers 4 based on the configuration of the transmission switching mechanism 5, as schematically illustrated. In practice, in this embodiment, microphones 3 and loudspeakers 4 are connected via the audio processing unit 6 and, based on the configuration of the transmission switching mechanism 5, the coupling between microphones 3 and loudspeakers 4 via a switching block is set in the audio processing unit 6. The switching block 7 either couples or decouples the loudspeakers 4 from the microphones 3.

The schematic illustration of FIGS. 3a (and 3b) shows whether a certain configuration of the transmission switching mechanism result in coupling or decoupling of loudspeakers 4 and microphones 3 and does not show the actual physical arrangement of microphones 3, loudspeakers 4, switching blocks 7, connections, and couplings.

When the transmission switching mechanism 5 is in a manually activated configuration 11, the external microphones 3 and internal loudspeakers 4 are communicatively coupled.

When the transmission switching mechanism is in a manually deactivated configuration 12, the external microphones 3 and internal loudspeakers 4 are communicatively decoupled. That is, in this particular embodiment, no audio signal is transmitted from the microphones 3 to the loudspeakers 4.

In FIG. 3b, a transmission switching mechanism 5 of another embodiment is illustrated schematically. Again, the figure does not show the actual physical arrangement of microphones 3, loudspeakers 4, switching blocks 7, connections, and couplings, but instead shows whether a certain configuration of the transmission switching mechanism 5 results in a coupling or a decoupling of the microphones 3 and loudspeakers 4.

Here, the transmission switching mechanism 5 is controlled via a touch-sensitive screen and comprises three possible configurations: a manually activated configuration 11, a manually deactivated configuration 12, and an automatic transmission configuration 13.

The manually activated configuration 11 and the manually deactivated configuration 12 of the embodiment in FIG. 3b are substantially similar to the manually activated configuration 11 and the manually deactivated configuration 12 of the embodiment in FIG. 3a, in the sense that they directly determine whether the external microphones 3 and the internal loudspeakers 4 are coupled or decoupled.

The automatic transmission configuration 13 has two sub-configurations: an automatically activated configuration 14 and an automatically deactivated configuration 15. In the automatically activated configuration 14, the microphones 3 and the loudspeakers 4 are coupled, similarly to in the manually activated configuration 11. Furthermore, in the automatically deactivated configuration 15, the microphones 3 and loudspeakers 4 are decoupled, similarly to in the manually deactivated configuration 12. While the transmission switching mechanism 5 is in the automatic transmission configuration 13, the audio processing unit 6 switches between the two sub-configurations 14, 15. For example, at one point in time, the sub-configuration of the automatic transmission configuration 13 is the automatically deactivated configuration 15, and based on analysis of external sound recorded by the external microphones 3, the audio processing unit switches the sub-configuration of the automatic transmission configuration 13 from the automatically deactivated configuration 15 to the automatically activated configuration 14 (or vice versa).

The switching of the automatic transmission configuration 13 between sub-configurations 14, 15 is performed by the audio processing unit 6 based on an analysis of content of the external sound performed by the audio processing unit 6 using an audio analysis block 16. In this particular embodiment, recorded external sound is compared to various sample sounds of sirens to determine whether the sound of a siren is present or not in the external sound. Upon recognition of a siren above a pre-determined sound threshold, the sub-configuration of the automatic transmission configuration 13 is switched to the automatically activated configuration 14.

In other embodiments of the invention, the automatic transmission configuration is switched based on other criteria, such as verbal content in the external sound, a vehicle motor sound or horn sound from other vehicles, proximity sensors or cameras of the vehicle in which the automobile audio system is integrated, etc.

Figure 4:
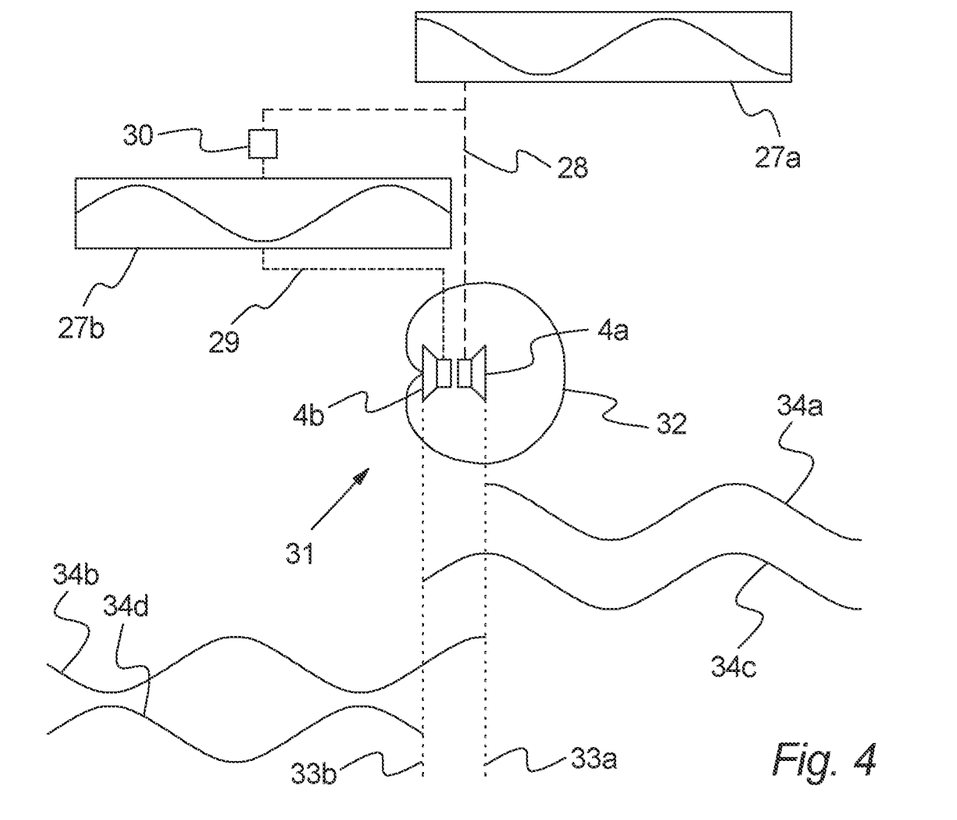
FIG. 4 illustrates exemplary generation of a directional reproduction of sound using loudspeaker pairs according to an embodiment of the invention.

FIG. 4 illustrates exemplary generation of a directional reproduction of sound 32 using loudspeaker pairs according to an embodiment of the invention.

The schematic illustration may be viewed in contrast to reproduction of sound from a single loudspeaker. When a single loudspeaker reproduces an audio signal, the single loudspeaker may generate an approximately isotropic reproduction of sound.

In FIG. 4, a loudspeaker pair 31 receives both a principal signal 28 and an accommodating signal 29, which is based on the same audio content. The principal signal 28 has an associated audio signal representation 27a, which displays the audio signal value as a function of time in a limited time window. In this exemplary illustration, the audio signal value resembles a sinusoidal curve. The principal signal is divided into two signal paths: one which transmits the signal directly to a forward loudspeaker 4a, and another which feeds the signal to a delay 30. The delay results in the establishment of an accommodating signal 29 and corresponds to a quarter of a period of the sinusoidal signal. Accordingly, the accommodating signal 29 has an associated audio signal representation 27b, which displays how the accommodating signal 29 is delayed compared to the principal signal 28 and its representation 27a. The delay further corresponds to a phase shift between the principal signal 28 and the accommodating signal 29. The accommodating signal 29 is supplied to the backward loudspeaker 4b of the pair of loudspeakers 31.

Thus, the forward loudspeaker 4a receives a principal signal 28, and the backward loudspeaker 4b receives an accommodating signal 29. Each of the loudspeakers 4a, 4b reproduce its received signal as sound represented by sound propagation signals 34a, 34b, 34c, 34d propagating in both directions relative to loudspeaker propagation points 33a, 33b of the two respective loudspeakers 4a, 4b. Thus, the horizontal direction of FIG. 4 may again be interpreted as a spatial axis on which the loudspeakers are located, such that sound may propagate in both directions of this axis. There is a distance between the two loudspeaker propagation points 33a, 33b. To generate a directional reproduction of sound 32, it is typically necessary to match signal processing with this distance.

The forward loudspeaker 4a symmetrically emits a sound propagation signal 34a to the right-hand side and another sound propagation signal 34b to the left-hand side relative to a loudspeaker propagation point 33a. The two signals 34a, 34b are mirrored due to opposite propagation directions. In a similar manner, the backward loudspeaker 4b symmetrically emits a sound propagation signal 34c to the right-hand side and another sound propagation signal 34d to the left-hand side relative to a loudspeaker propagation point 33b.

If only considering the sound radiation from one of the two loudspeakers, an isotropic reproduction of sound is; at least in this simple model of radiation.

However, for the loudspeaker pair 31, interference has to be taken into account. The resulting directional reproduction of sound 32 is thus based on a superposition of the individual contributions of sound propagation signals 34a, 34b, 34c, 34d. To the right-hand side, a sound propagation signal 34a of the forward loudspeaker 4a and a sound propagation signal 34c of the backward loudspeaker 4b interfere constructively. In contrast, to the left-hand side, a sound propagation signal 34b of the forward loudspeaker 4a and a sound propagation signal 34b of the backward loudspeaker 4b interfere destructively. Destructive interference to the left-hand side and constructive interference to the right-hand side result in a directional reproduction of sound 32.

Reproduction of sound from a loudspeaker pair may for example be considered directional if substantially more radiation is emitted in one direction in comparison with in one other direction, e.g., an opposite direction. In this particular illustration, the directional reproduction of sound 32 is illustrated as a cardioid radiation pattern, radiating from the center of the loudspeaker pair 31. However, embodiments of the invention are not restricted to a particular distribution of radiation.

In the exemplary illustration, the directional reproduction of sound 32 has a propagation direction to the right-hand side, its intensity to the right-hand side is larger than to its left-hand side, and an integration of the intensity to the right-hand side is larger than an integration of the intensity to the left-hand side.

Thus, an approach to generate a directional reproduction of sound has been outlined. This approach may be employed for implementation of the invention, for example for providing individualized sound to individual occupants of an automobile, or the generate sound directionality in the reproduction of external sound.

However, note that other approached for generating a directional reproduction of sound may also be employed according to the invention, within the scope of the claims. Particularly, more detailed processing is required for generating a directional reproduction of sound across a broad range of frequencies, e.g. a frequency dependent delay or phase shift.

Figure 5:
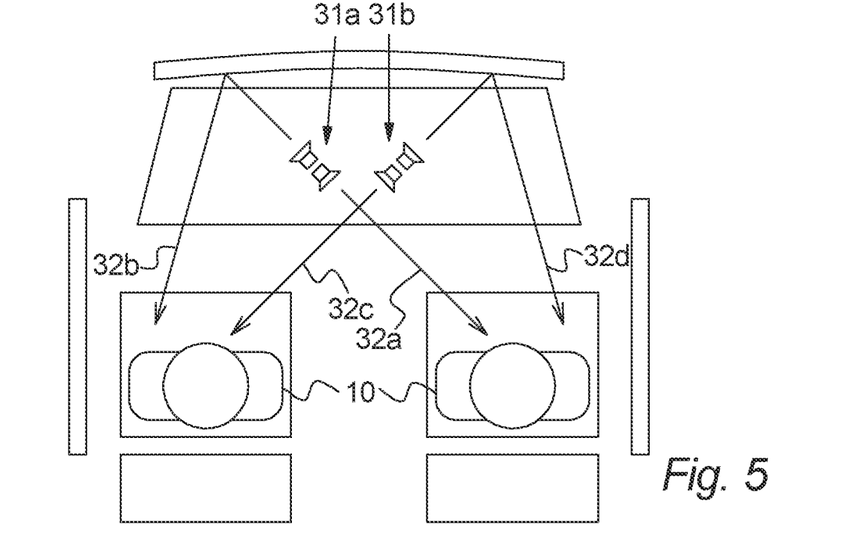
FIG. 5 illustrates exemplary guiding of directional reproduction of sound to individual occupants according to an embodiment of the invention.

FIG. 5 illustrates exemplary guiding of directional reproduction of sound 32a-d to individual occupants 10 according to an embodiment of the invention. Such direction reproduction may for example be implemented using loudspeaker pairs is introduced in relation to FIG. 4.

In this embodiment, the two loudspeaker pairs 31a, 31b of FIG. 5 are each be integrated into the dashboard of an automobile. Optionally, wave guides may also be integrated in the dashboard to ensure that the sound from the loudspeakers are guided outward from the dashboard.

Each of the two loudspeaker pairs 31a, 31b are arranged to generate two directional reproductions of sound 32a, 32b, 32c, 32d, which in FIG. 5 are illustrated as arrows, for simplicity. The arrows may for example be interpreted as a propagation direction.

The first loudspeaker pair 31a receives one principal signal and one accommodating signal based on one audio signal to generate one directional reproduction of sound 32a. Further, the first loudspeaker pair received another accommodating signal and another principal signal based on another audio signal to generate another direction reproduction of sound 32b, with an opposite propagation direction. Resultingly, the loudspeaker pair 31a can generate two directional reproductions of sound 32a, 32b simultaneously.

Similarly, the second loudspeaker pair can simultaneously generate two other directional reproductions of sound 32c, 32d.

The first loudspeaker pair 31a thus generates a first forward directional reproduction of sound 32a and a first backward directional reproduction of sound 32b. These are initially guided slightly upwards by waveguides. Subsequent to any initial guiding, the first forward directional reproduction of sound 32a arrives to a right-hand side occupant 10. The first backward directional reproduction of sound 32b arrives at the windscreen of the automobile which acts as a sound reflection surface to reflect this directional reproduction of sound 32b towards a left-hand side occupant 10.

In a similar manner, the second loudspeaker pair 31b generates a second forward directional reproduction of sound 32c and a second backward directional reproduction of sound 32d. These are initially guided slightly upwards by waveguides. Subsequent to any initial guiding, the second forward directional reproduction of sound 32c arrives to the left-hand side occupant 10. The second backward directional reproduction of sound 32d arrives at the windscreen which again acts as a sound reflection surface to reflect this directional reproduction of sound 32d towards the right-hand side occupant 10.

As a result of the directional reproduction of sound, each of the two occupants receive two separate audio signals. As indicated in the figure, these two audio signals may even primarily arrive to in different regions, e.g., different sides, of the occupants. That is, for the right-hand side occupant 10, the first forward directional reproduction of sound 32a arrives at the left-hand side of that occupant 10, and the second backward directional reproduction of sound 32d arrives at the right-hand side of that occupant 10.

In this way, the two occupants 10 in the two occupant locations may each for example receive personalized stereo audio.

FIG. 5 illustrates one example of guiding directional reproduction of sound to occupant locations. In other embodiments, radiation may for example be guided using further reflections, e.g., on the headliner of the automobile, on side windows, on rear windows, on glass panel roofs or a surface dedicated for reflection. Radiation may further be guided using any type of waveguide. Additionally, embodiments of the invention do not necessarily include use of a sound reflection surface.

Loudspeaker pairs may be located in any location of an automobile, e.g., integrated in car doors, car seats, or other parts of the interior of the car.

Personalized audio may further be guided to any occupant location, e.g., backseats in an automobile.

Personalized audio enables reproduction of external sound to individual occupants in a vehicle which is advantageous. In some embodiments, several occupants each have a personal transmission switching mechanism, which control coupling of external microphones with a different subset of internal loudspeakers which provide personalized audio for an occupant associated with that personal transmission switching mechanisms. As a result, each individual occupant may control whether external sound is reproduced for that occupant while minimizing sound near other occupants, which is advantageous.

Personalized audio may further be used for providing an external sound cancellation signal for individual occupants using principles of conventional active noise control. For example, if one occupant has enabled coupling via a personal transmission switching mechanism such that a reproduction of external sound is provided to that occupant, another occupant may, optionally, receive an external sound cancellation signal for canceling the (reproduction of) external sound. Thus, when such a cancellation system is enabled, one occupant's desire to listen to external sound may minimally influence external sound perceived by other occupants, which is advantageous.

Alternatively, personalized audio may be provided using one or more loudspeaker arrays, e.g., utilizing principles of beamforming.

Figure 6:
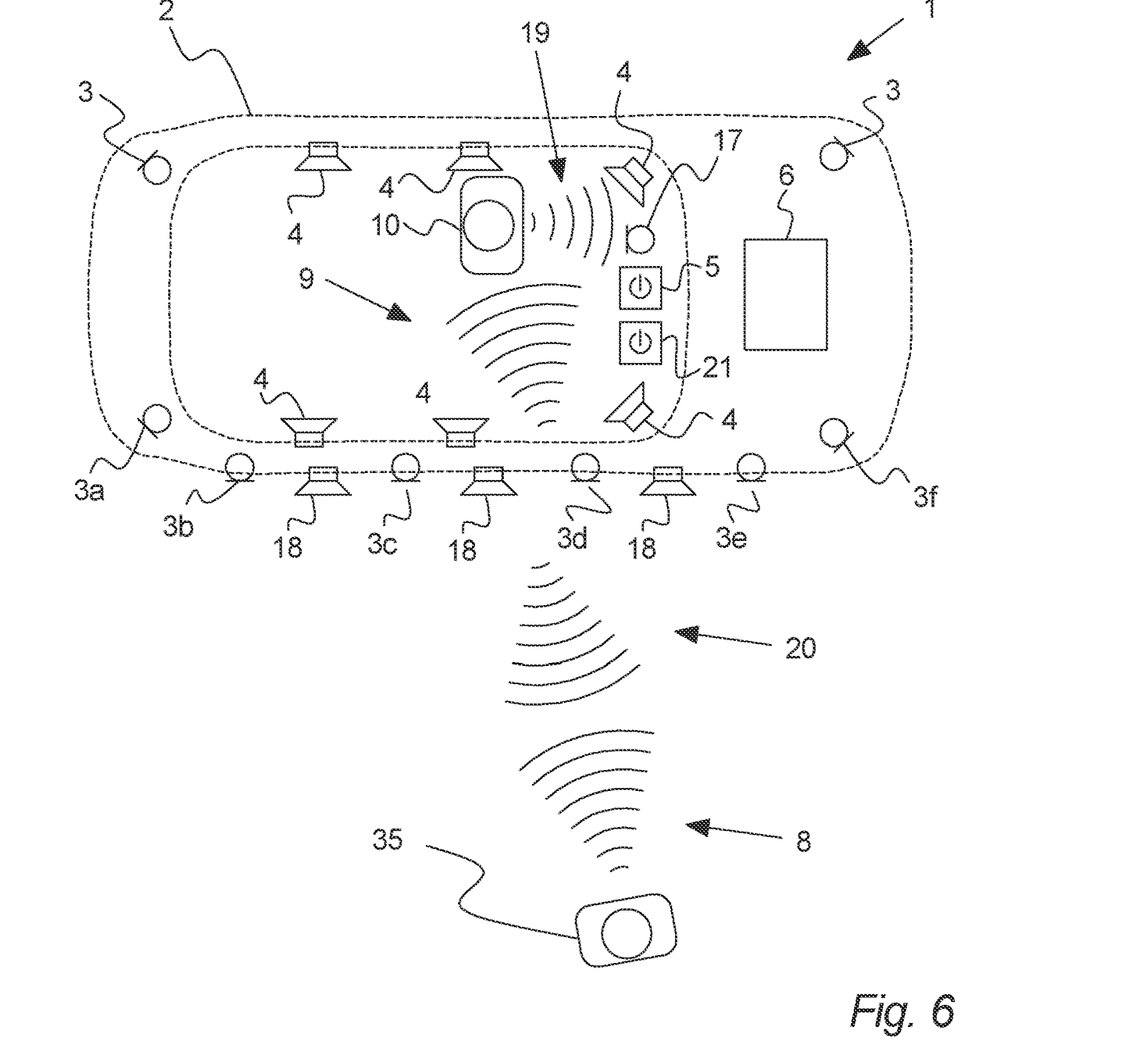
FIG. 6 illustrates two-way communication by using a communication switching mechanism according to an embodiment of the invention.

FIG. 6 illustrates two-way communication by using a communication switching mechanism 21 according to an embodiment of the invention.

As in FIG. 1, the arrangement of the audio system 1 relative to an automobile 2 illustrated with dashed lines indicate a possible integration of the automobile audio system 1 in an automobile 2.

The illustrated embodiment is capable of recording external sound based on beamforming to obtain a sound directionality of the external sound, e.g., similarly to any embodiments described in relation to FIG. 2.

Further, when the automobile audio system 1 is integrated in an automobile 2, the embodiment in FIG. 6 permits two-way communication, e.g., with a pedestrian 35.

As previously, a transmission switching mechanism 5 is manually configurable between a manually activated configuration and a manually deactivated configuration. In the manually activated configuration, external sound is recorded based on beamforming to obtain a sound directionality, and the audio processing unit 6 replicates this sound directionality inside the automobile 2 via the internal loudspeakers 4. As a result, external sound 8 emitted by a pedestrian 35, e.g., speech, can be heard by an occupant 10 of the vehicle, and the occupant receives an indication of the relative position of the pedestrian via the directionality of the reproduction of external sound 9.

In addition, the embodiment comprises a set of internal microphones 17, a set of external loudspeakers 18, and a communication switching mechanism 21. In similarity with the transmission switching mechanism 5, the communication switching mechanism 21 is a type of manually configurable switch, which controls coupling between loudspeakers and microphones, albeit internal microphones 17 and external loudspeakers 18. It is manually controllable from the automobile interior by at least one occupant of the automobile (upon integration of the automobile audio system). In the current embodiment, the communication switching mechanism 21 is implemented as a physical push-button, but may alternatively be implemented as a switch, lever, in a touch-sensitive display, through voice control etc.

The communication switching mechanism 21 has two configurations: a manually activated communication configuration and a manually deactivated communication configuration. In the manually activated communication configuration, the set of internal microphones 17 is communicatively coupled to the set of external loudspeakers 18, such that any internal sound 19 is reproducible/reproduced by the external loudspeakers 18. In the manually deactivated communication configuration, the set of internal microphones 17 is communicatively decoupled to the set of external loudspeakers 18. That is, internal sound 19 is not reproduced/reproducible by the external loudspeakers 18.

In the illustration of the embodiment, the communication switching mechanism 21 is in the manually activated communication configuration. The occupant 10 of the automobile 2 generated internal sound 19, e.g., speech. At least one internal microphone 17 records this sound, and since the communication switching mechanism is in the manually activated communication configuration, the recorded sound is transmitted to at least some of the external loudspeakers 18 via the audio processing unit 6. When the external loudspeakers reproduce the internal sound to generate a reproduction of the internal sound 20, the external loudspeakers 18 utilize beamforming principles to establish a sound directionality of the reproduction of the internal sound 20. The beamforming principles used here are the same as those used to generate a directionality of the reproduction of external sound 9 inside the automobile 2 in some embodiments and are implemented via the audio processing unit 6. As indicated in the illustration, the directionality of the reproduction of the internal sound 20 mirrors the external sound 8, such that the reproduction of the internal sound 20 is primarily emitted towards the direction from which the external sound was emitted. In this context mirroring the directionality may also be understood as retroreflecting the directionality.

Thus, having a communication switching mechanism in combination with internal microphones and external loudspeakers may permit two-way communication between an occupant 10 of an automobile 2 and an external person such as a pedestrian 35, which is advantageous.

Some other embodiments of the invention have a communication switching mechanism permitting two-way communication, but does not have a directional reproduction of external sound 9 and/or a directional reproduction of internal sound 20.

In some embodiments of the invention, the transmission switching mechanism 5 and the communication switching mechanism 21 are combined in a combined switching mechanism. Such a combined switching mechanism may for example simultaneously couple/decouple external microphones 3 and external loudspeakers 18 with internal loudspeakers 4 and internal microphones 17, respectively.

Figure 7:
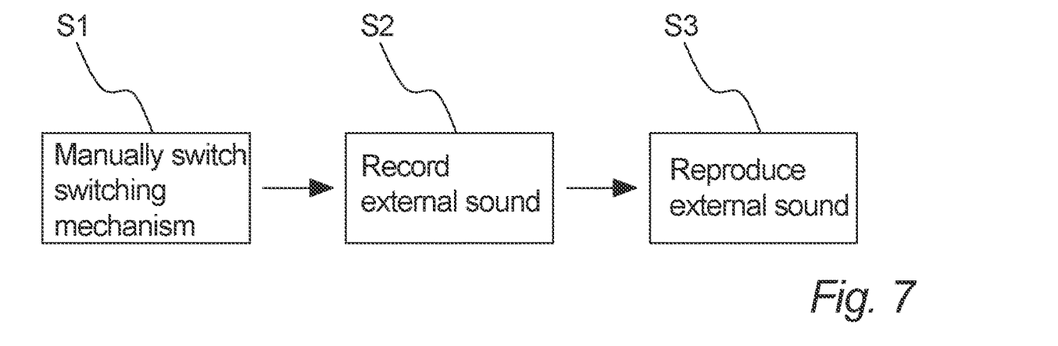
FIG. 7 illustrates method steps for selectively reproducing external sound in an automobile according to an embodiment of the invention.

FIG. 7 illustrates method steps S1-S3 for selectively reproducing external sound in an automobile according to an embodiment of the invention.

In a first step S1 of the method, a transmission switching mechanism is manually switched to communicatively couple a set of external microphones to a set of internal loudspeakers.

The microphones and the loudspeakers are coupled via an audio processing unit. The external microphones are located on an automobile exterior of the automobile, and the internal loudspeakers are located within an automobile interior of the automobile.

The manual switching may for example be from a manually deactivated configuration where the set of external microphones are communicatively decoupled to the internal loudspeakers to a manually activated configuration where the set of external microphones are communicatively coupled to the internal loudspeakers.

In a next step S2 of the method, external sound is recorded using the set of external microphones.

In a final step S3 of the method, at least a part of the external sound is reproduced using at least a subset of the set of internal loudspeakers.

Figure 8A:
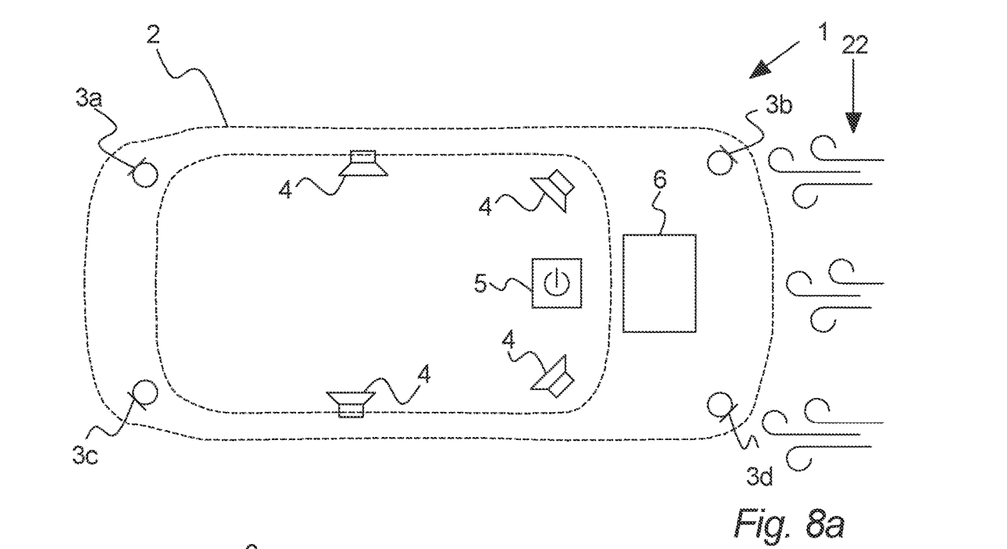
FIGS. 8a-c illustrate wind and schematic processing for reduction of wind noise content according to embodiments of the invention.
Figure 8B:
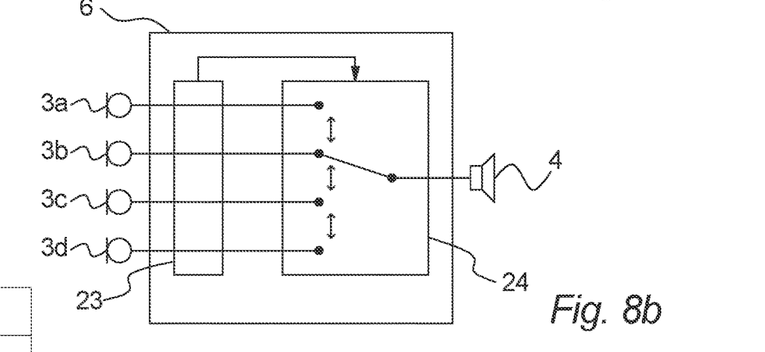
Figure 8C:
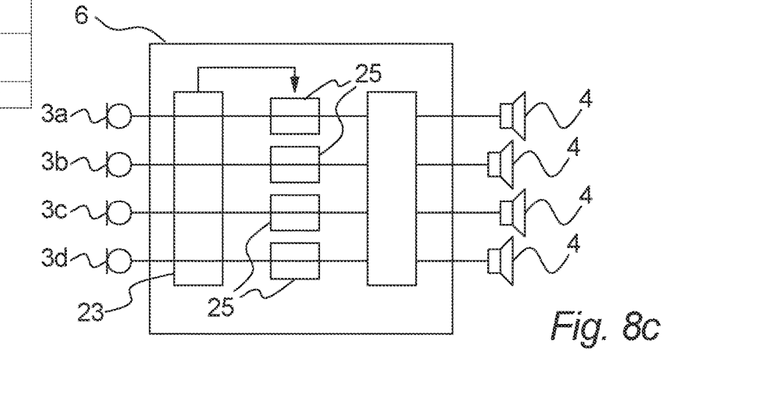

FIGS. 8a-c illustrate wind 22 and schematic processing for reduction of wind noise content according to embodiments of the invention.

FIG. 8a is a simple illustration of how an automobile 2 according to the invention may be exposed to winds 22 or drafts. Such winds/drafts may for example be due to the weather, due to movement of the automobile 2, or a combination.

Wind 22 may result in wind noise picked up by microphones. In the illustration, particularly two of the microphones 3b, 3d are largely exposed to wind 22, and will generate a large degree of wind noise content in their recorded audio signals, whereas the two remaining microphones 3a, 3c are minimally exposed to wind 22 and will generate a small degree of wind noise content.

Since reproduction of external sound is an aspect of the invention, treating/minimizing any wind noise content is advantageous. Such treating/minimizing of wind noise content may for example be performed via the audio processing unit 6 as illustrated in FIG. 8b and FIG. 8c, which provide different approaches.

In FIG. 8b, the audio processing unit 6 receives recoded sound signals recorded from the external microphones 3a, 3b, 3c, 3d. These signals are analyzed in a wind noise analysis block 23. Wind noise in audio signals may be characterized by a relatively large DC and/or low frequency component. Low frequencies may for example be below 100 Hz, below 50 Hz, or below 20 Hz.

The wind noise analysis block 23 is configured to identify wind noise content in the audio signals from the microphones 3a, 3b, 3c, 3d. In practice, this can be implemented by a comparison of the recordings from the microphones to identify one or more microphones with most or least DC/low-frequency content. For example, the integrated signal amplitude of content below 50 Hz is regularly calculated for each for the signals and are compared to identify which two microphones provide the most wind noise content, and which two microphones provide the least wind noise content.

After the wind noise analysis block 23, the signals are forwarded to a microphone selection block 24. Here, one or more microphones 3a, 3b, 3c, 3d are selected for reproduction of the external sound via internal loudspeakers 4. The selection is performed based on input from the wind noise analysis block. For example, the wind noise analysis block has determined that two microphones 3b, 3d have a relatively large amount of wind noise content, and that two other microphones 3a, 3c have a relatively small amount of wind noise content. Accordingly, reproduction of external sound via internal loudspeakers 4 is based only on the signals from the two microphones 3a, 3c with the relatively small amount of wind noise content.

The selection block regularly/continuously selects which microphones(s)/recorded sound signals are forwarded to the loudspeaker(s).

In an alternative embodiment, the audio signals from each of the microphones are compared to an absolute DC or low-frequency threshold for wind noise content, to identify whether an audio signal has wind noise content or not. The reproduction of external sound is then only based on microphones for which the audio signal analysis block has not identified wind noise content.

In the embodiment of FIG. 8c, the audio processing unit 6 again receives recoded sound signals recorded from the external microphones 3a, 3b, 3c, 3d. Again, these signals are analyzed in a wind noise analysis block 23 to identify wind noise content, for example as exemplified above. However, here each of the recorded sound signals are provided to individual wind noise filters 25. These filters 25 are individually dynamically reconfigured based on input from the wind noise analysis block 23, such that wind noise content is reduced when reproducing the external sound. A filter may for example be a high-pass filter, in which filter coefficients, such as cut-off frequency, attenuation, and filter order are dynamically adjusted.

The principles of this embodiment may also be applied in other contexts, than for an automobile audio system. For example, headphones configured to perform active noise control, may have several microphones of which one is more exposed to wind than another microphone. Wind noise recorded by a microphone used for active noise control may be transmitted to the user of the headphones. By dynamically selecting which microphone(s) the active noise control is based on, wind noise heard by the user may be reduced, which is advantageous.

In the following, various embodiments of the invention are presented without reference to particular figures.

Generally, automobiles according to the invention may comprise any of the automobile audio systems of the disclosure. Further, methods according to the invention may be facilitated by any automobile audio system or automobile of the disclosure. Similarly, automobiles or automobile audio systems according to the invention may facilitate any method of the disclosure.

In an embodiment of the invention, the automobile audio system is configured to facilitate two-way intervehicle communication between the automobile and an auxiliary automobile.

For example, the automobile audio system may be configured to identify if another nearby automobile has its own automobile audio system configured for two-way communication. Upon such identification, two-way communication may be initiated by a switching mechanism, e.g., a dedicated two-way communication switching mechanism or the transmission switching mechanism. Internal sound recorded by internal microphones of the automobile can then be reproduced by internal loudspeakers of the other automobile, and/or internal sound recorded by internal microphones of the other automobile can be reproduced by internal loudspeakers of the automobile. Audio signals carrying the internal sound is transmitted wirelessly between the automobiles via an antenna connected to the audio processing unit.

In an embodiment of the invention, the audio signal processor is communicatively connected to a visual indicator configured to visually indicate the sound directionality of external sound.

For example, external sound is recorded using beamforming principles to obtain the directionality of external sound. The visual indicator is a digital display device. The directionality of the external sound is then presented by the visual indicator, such that one or more occupants of the vehicle may visually receive an indication of the directionality. Such a visual indication may be more precisely perceived by occupants, than are purely audible indication, and a visual indicator may thus be advantageous.

In some embodiments of the invention, the sound directionality of the external sound is obtained via beamforming (as exemplified in FIG. 2), the transmission switching mechanism has an automatic transmission configuration, the internal loudspeakers comprise internal loudspeaker pairs for directional reproduction of the external sound, the automobile audio system comprises a communication switching mechanism, and/or the automobile audio system is configured to reduce wind noise content in recorded sound signals.

In some embodiments of the invention, the transmission switching mechanism has an automatic transmission configuration, the internal loudspeakers comprise internal loudspeaker pairs for directional reproduction of the external sound, the automobile audio system comprises a communication switching mechanism, and/or the automobile audio system is configured to reduce wind noise content in recorded sound signals.

In some embodiments of the invention, the internal loudspeakers comprise internal loudspeaker pairs for directional reproduction of the external sound, the automobile audio system comprises a communication switching mechanism, and/or the automobile audio system is configured to reduce wind noise content in recorded sound signals.

In some embodiments of the invention, the automobile audio system comprises a communication switching mechanism and the automobile audio system is configured to reduce wind noise content in recorded sound signals.

From the above, it is now clear that the invention relates to automobile audio system which permits an occupant of the automobile to control to what extent external sound is reproduced in the automobile.

The invention has been exemplified above with the purpose of illustration rather than limitation with reference to specific examples of methods and embodiments. Details such as a specific method and system structures have been provided in order to understand embodiments of the invention. Note that detailed descriptions of well-known systems, devices, circuits, and methods have been omitted so as to not obscure the description of the invention with unnecessary details. It should be understood that the invention is not limited to the particular examples described above and a person skilled in the art can also implement the invention in other embodiments without these specific details. As such, the invention may be designed and altered in a multitude of varieties within the scope of the invention as specified in the claims.

LIST OF REFERENCE SIGNS

1 Automobile audio system
2 Automobile
3 External microphone
4 Internal loudspeaker
5 Transmission switching mechanism 6 Audio processing unit
7 Switching block
8 External sound
9 Reproduction of external sound
10 Occupant
11 Manually activated configuration
12 Manually deactivated configuration
13 Automatic transmission configuration
14 Automatically activated configuration
15 Automatically deactivated configuration
16 Audio analysis block
17 Internal microphone
18 External loudspeaker
19 Internal sound
20 Reproduction of internal sound
21 Communication switching mechanism
22 Wind
23 Wind noise analysis block
24 Microphone selection block
25 Wind noise filter
27 Audio signal representation
28 Principal signal
29 Accommodating signal
30 Delay
31 Loudspeaker pair
32 Directional reproduction of sound
33 Loudspeaker propagation point
34 Sound propagation signal
35 Pedestrian
S1-S3 Method steps

The invention claimed is:

1. An automobile audio system for an automobile, said automobile audio system comprising:
   an audio processing unit;
   a set of external microphones communicatively connected to said audio processing unit to record external sound;
   a set of internal loudspeakers communicatively connected to said audio processing unit to internally reproduce audio; and
   a transmission switching mechanism at least partly controlling said audio processing unit,
   wherein said transmission switching mechanism is manually configurable between at least two manual transmission configurations comprising:
     a manually activated configuration wherein said set of external microphones is communicatively coupled to said set of internal loudspeakers such that at least a part of said external sound is reproducible by at least a subset of said set of internal loudspeakers; and
     a manually deactivated configuration wherein said set of external microphones is communicatively decoupled to said set of internal loudspeakers,
   wherein said transmission switching mechanism is one of several transmission switching mechanisms for individual occupants of said automobile,
   wherein each of said transmission switching mechanisms comprises said at least two manual transmission configurations, and
   wherein said manually activated configuration of said at least two manual transmission configurations of each of said transmission switching mechanisms communicatively couples said set of external microphones to a different subset of said set of internal loudspeakers.

2. The automobile audio system according to claim 1, further comprising a manually adjustable transmission volume mechanism which regulates a loudness of reproduction of said external sound in said vehicle via said set of internal loudspeakers.

3. The automobile audio system according to claim 2, wherein said transmission volume mechanism is independently controllable from any of music volume of said automobile audio system and telecommunication volume of said automobile audio system.

4. The automobile audio system according to claim 1, wherein said set of external microphones is configured to record said external sound based on beamforming to obtain a sound directionality of at least a part of said external sound, and
   wherein said audio processing unit is configured to replicate said sound directionality via said set of internal loudspeakers.

5. The automobile audio system according to claim 4, wherein said audio processing unit comprises at least one frequency-dependent directionality filter which filters a recording of said external sound to establish a directionality-encoded audio signal which is coupled to said set of internal loudspeakers to replicate said sound directionality via said set of internal loudspeakers.

6. The automobile audio system according to claim 4, wherein said audio processing unit is communicatively connected to a visual indicator configured to visually indicate said sound directionality.

7. The automobile audio system according to claim 1, wherein said at least two manual transmission configurations are manually configurable to an automatic transmission configuration having at least two sub-configurations, and
   wherein said at least two sub-configurations comprise:
     an automatically activated configuration wherein said set of external microphones is communicatively coupled to said set of internal loudspeakers such that at least a part of said external is reproducible by at least a subset of said set of internal loudspeakers; and
     an automatically deactivated configuration wherein said set of external microphones is communicatively decoupled to said set of internal loudspeakers.

8. The automobile audio system according to claim 7, wherein said audio processing unit is configured to automatically switch between said at least two sub-configurations of said automatic transmission configuration based on an analysis of content of said external sound by said audio processing unit.

9. The automobile audio system according to claim 1, wherein said set of internal loudspeakers comprises one or more loudspeaker pairs, each comprising a forward loudspeaker and a backward loudspeaker respectively coupled to a principal signal and an accommodating signal which are phase shifted relatively to each other and based on similar sound content such that reproduction of said external sound by a loudspeaker pair of said one or more loudspeaker pairs is directional.

10. The automobile audio system according to claim 1, wherein said set of internal loudspeakers comprises at least one loudspeaker array, and
    wherein said audio processing unit is configured to reproduce said external sound via said at least one loudspeaker array based on beamforming.

11. The automobile audio system according to claim 1, wherein said audio processing unit is configured to generate an external sound cancellation signal for cancelling said external sound,
    wherein said external sound is reproduced in a first subset of said set of internal loudspeakers and said external sound cancellation signal is reproduced in a second subset of said set of internal loudspeakers, and wherein said first subset and said second subset are different subsets.

12. The automobile audio system according to claim 1, further comprising:

a set of internal microphones communicatively connected to said audio processing unit to record internal sound;

a set of external loudspeakers communicatively connected to said audio processing unit to externally reproduce audio; and a communication switching mechanism at least partly controlling said audio processing unit, wherein said communication switching mechanism is manually configurable between at least two manual communication configurations comprising:

a manually activated communication configuration wherein said set of internal microphones is communicatively coupled to said set of external loudspeakers such that at least a part of said internal sound is reproducible by at least a subset of said set of external loudspeakers; and a manually deactivated communication configuration wherein said set of internal microphones is communicatively decoupled to said set of external loudspeakers.

13. The automobile audio system according to claim 12, wherein said set of external microphones is configured to record said external sound based on beamforming to obtain a sound directionality of at least a part of said external sound, and wherein said audio processing unit is configured to mirror said sound directionally via said external loudspeakers when at least a part of said internal sound is reproduced.

14. The automobile audio system according to claim 1, wherein said automobile audio system is configured to facilitate two-way intervehicle communication between said automobile and an auxiliary automobile.

15. An automobile comprising an automobile audio system, said automobile audio system comprising:

an audio processing unit;

a set of external microphones communicatively connected to said audio processing unit and located on an automobile exterior of said automobile for recording external sound;

a set of internal loudspeakers communicatively connected to said audio processing unit and located within an automobile interior of said automobile; and a transmission switching mechanism at least partly controlling said audio processing unit, wherein said transmission switching mechanism is manually configurable between at least two manual transmission configurations comprising:

a manually activated configuration wherein said set of external microphones is communicatively coupled to said set of internal loudspeakers such that at least a part of said external sound is reproducible by at least a subset of said set of internal loudspeakers; and a manually deactivated configuration wherein said set of external microphones is communicatively decoupled to said set of internal loudspeakers, wherein said transmission switching mechanism is one of several transmission switching mechanisms for individual occupants of said automobile, wherein each of said transmission switching mechanisms comprises said at least two manual transmission configurations, and wherein said manually activated configuration of said at least two manual transmission configurations of each of said transmission switching mechanisms communicatively couples said set of external microphones to a different subset of said set of internal loudspeakers.

16. A method for selectively reproducing external sound in an automobile, said method comprising:

manually switching a transmission switching mechanism to communicatively couple via an audio processing unit a set of external microphones located on an automobile exterior of said automobile to a set of internal loudspeakers located within an automobile interior of said automobile;

recording said external sound using said set of external microphones;

reproducing at least a part of said external sound using at least a subset of said set of internal loudspeakers, wherein said transmission switching mechanism is one of several transmission switching mechanisms for individual occupants of said automobile, and each of said transmission switching mechanisms comprises a manually activated configuration and a manually deactivated configuration; and communicatively coupling said set of external microphones to a different subset of said set of internal loudspeakers when said individual occupants of said automobile conducts said manually activated configuration of said at least two manual transmission configurations of each of said transmission switching mechanisms.

17. The automobile audio system according to claim 16, wherein said recording said external sound establishes a set of recorded sound signals based on said external sound, and wherein said method further comprises analyzing said set of recorded sound signals using said audio processing unit to identify wind noise content in said set of recorded sound signals.

18. The automobile audio system according to claim 17, further comprising filtering said set of recorded sound signals to establish at least one filtered sound signal by said audio processing unit, wherein said wind noise content is reduced relatively in said at least one filtered sound signal in comparison with a sound signal of said set of recorded sound signals, and wherein said reproducing at least a part of said external sound is based on said at least one filtered sound signal.

19. The automobile audio system according to claim 17, further comprising selecting a subset of said set of recorded sound signals based on said step of analyzing said set of recorded sound signals, wherein said reproducing at least a part of said external sound is based on said subset of said set of recorded sound signals such that said wind noise content in said subset of said set of recorded sound signals is lesser than said wind noise content in a sound signal of said set of recorded sound signals.

* * * * *